(12) United States Patent
Jeong et al.

(10) Patent No.: US 12,149,043 B2
(45) Date of Patent: Nov. 19, 2024

(54) PHASE STABILIZATION SYSTEM AND PHASE STABILIZATION METHOD USING THE SAME

(71) Applicant: AGENCY FOR DEFENSE DEVELOPMENT, Daejeon (KR)

(72) Inventors: Taek Jeong, Daejeon (KR); Dong Kyu Kim, Daejeon (KR); Duk Young Kim, Daejeon (KR); Sang Kyung Lee, Daejeon (KR); Zae Ill Kim, Daejeon (KR); Yong Sup Ihn, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 502 days.

(21) Appl. No.: 17/695,153

(22) Filed: Mar. 15, 2022

(65) Prior Publication Data
US 2022/0302668 A1 Sep. 22, 2022

(30) Foreign Application Priority Data
Mar. 16, 2021 (KR) .................. 10-2021-0034161

(51) Int. Cl.
*H01S 3/13* (2006.01)
*G01J 3/42* (2006.01)

(52) U.S. Cl.
CPC .............. *H01S 3/1307* (2013.01); *G01J 3/42* (2013.01)

(58) Field of Classification Search
CPC . H01S 3/1307; H01S 3/10; G01J 3/42; G01B 9/02076; G01B 9/02044; G01B 9/02001; G01B 9/02027; G01B 9/02055; G01B 9/02083; G01B 9/02091; G01B 2290/30
See application file for complete search history.

(56) References Cited

U.S. PATENT DOCUMENTS

| | | | | |
|---|---|---|---|---|
| 6,141,138 A | * | 10/2000 | Machida | ........... G01J 9/00 359/279 |
| 2003/0184759 A1 | * | 10/2003 | Hill | ........... G01B 9/02061 356/498 |
| 2008/0304075 A1 | * | 12/2008 | Rembe | ........... G01B 9/02003 356/457 |
| 2011/0150226 A1 | | 6/2011 | Cho | |
| 2016/0181759 A1 | * | 6/2016 | Holzwarth | ........... H01S 3/137 372/98 |
| 2021/0033380 A1 | * | 2/2021 | Sternklar | ........... G01B 9/0201 |

FOREIGN PATENT DOCUMENTS

| | | |
|---|---|---|
| JP | H11-351814 A | 12/1999 |
| JP | 2005-517913 B1 | 6/2005 |
| KR | 20070069423 A | 7/2007 |
| KR | 101319921 B1 | 10/2013 |
| KR | 101327661 B1 | 11/2013 |

OTHER PUBLICATIONS

Korean Office Action dated Nov. 1, 2022 in corresponding Korean Application No. 10-2021-0034161.

* cited by examiner

*Primary Examiner* — Xinning (Tom) Niu
(74) *Attorney, Agent, or Firm* — MILES & STOCKBRIDGE P.C.

(57) ABSTRACT

Disclosed is a technology for stabilizing a phase using a modulator bias controller and a laser that emits a beam with a frequency fixed.

10 Claims, 6 Drawing Sheets

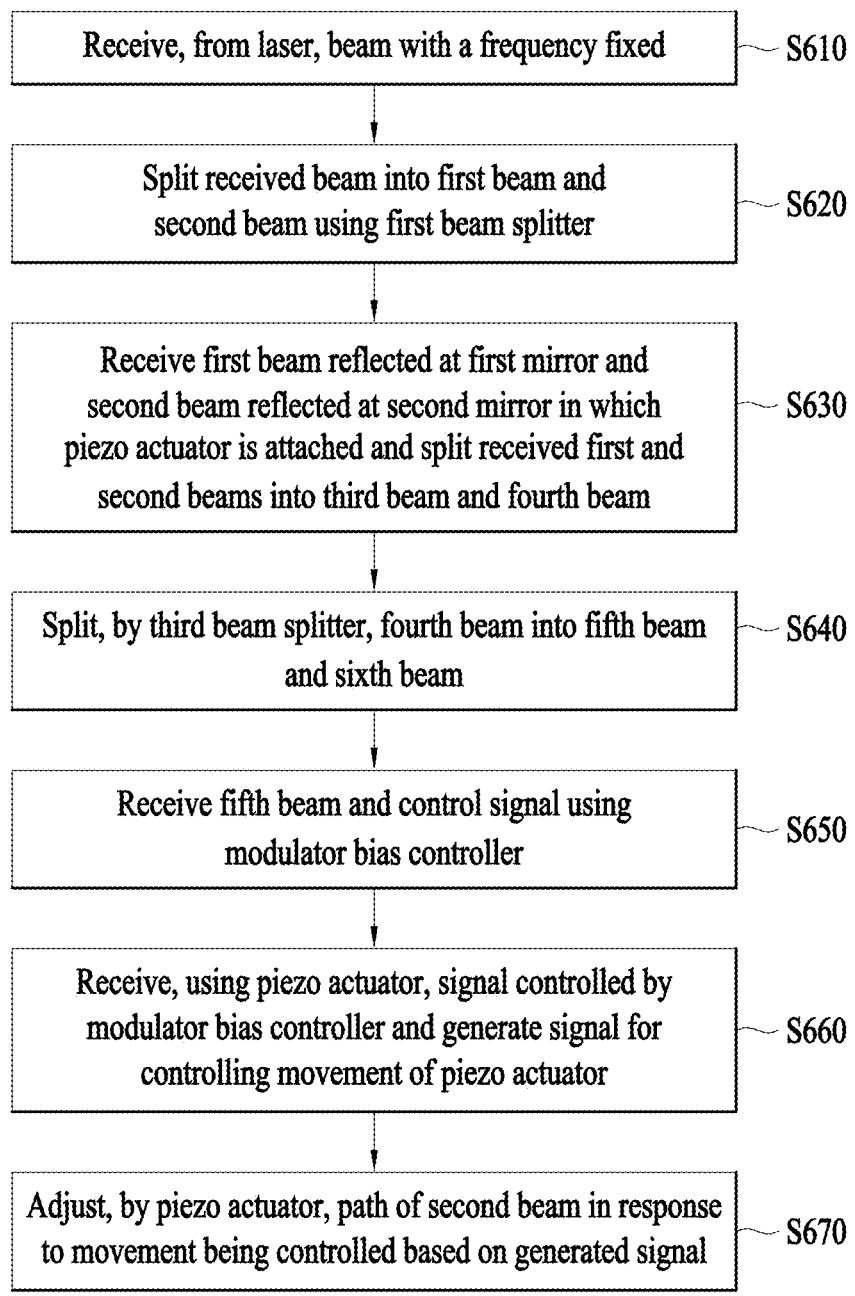

PHASE STABILIZATION SYSTEM AND PHASE STABILIZATION METHOD USING THE SAME

CROSS-REFERENCE TO RELATED APPLICATION(S)

This application claims the benefit of Korean Patent Application No. 10-2021-0034161, filed on Mar. 16, 2021, in the Korean Intellectual Property Office, the disclosure of which is incorporated herein by reference.

BACKGROUND

Field of the Invention

Example embodiments of the present disclosure relate to a phase stabilization method and system for stabilizing a phase using a modulator bias controller and a beam with a frequency fixed.

Description of the Related Art

Precise measurement is a significant subject in basic science and various fields. A representative method for precisely measuring a minute path or phase change is to use an optical interferometer. An interferometer is a device used to measure optical properties such as characteristics of light or a refractive index and thickness of a medium placed on a path by measuring interference fringes that occur according to a difference between two paths of the light. When constructing the interferometer, it is required to precisely align an optical system and to stabilize and maintain a relative phase between the two paths of the interferometer. The most representative interferometers are the Michelson interferometer and the Mach-Zehnder interferometer. In these interferometers, the path of light is separated and then re-collected. Thus, the phase becomes unstable due to the flow of the atmosphere or minute vibrations, which makes it difficult to construct a stable interferometer. In order to stabilize the phase, a special interferometer, such as a Sagnac interferometer, which is stable against external shocks by matching the paths of light so that two lights passing through the same path have a coherent phase change may be used. However, such a special interferometer is restricted in use. Accordingly, there is a desire for technology to stably maintain a phase in various experiments.

SUMMARY

An aspect provides technology for stabilizing a phase using a modulator bias controller and a beam with a frequency fixed. Technical goals of the present disclosure are not limited to the aforementioned technical features, and other unstated technical goals may be inferred from example embodiments below.

According to an aspect, there is provided a phase stabilization system including a laser configured to emit a beam with a frequency fixed, a first beam splitter configured to split the beam received from the laser into a first beam and a second beam, a first mirror configured to reflect the first beam, a second mirror configured to reflect the second beam, wherein a piezo actuator is attached to one side of the second mirror, a second beam splitter configured to receive the first beam reflected at the first mirror and the second beam reflected at the second mirror and split the received first and second beams into a third beam and a fourth beam, a first photodetector configured to detect the third beam output from one side of the second beam splitter, a third beam splitter configured to receive the fourth beam output from the other side of the second beam splitter and split the received fourth beam into a fifth beam and a sixth beam, a modulator bias controller configured to receive the fifth beam output from one side of the third beam splitter, a second photodetector configured to detect the sixth beam output from the other side of the third beam splitter, and a piezo controller configured to receive a signal controlled by the modulator bias controller.

The beam emitted by the laser may have a frequency fixed to an atomic transition line obtained from an atomic spectroscopy method using a wavelength tunable laser and an atomic vapor cell including an alkali atom.

The wavelength tunable laser may use a laser selected from an external cavity diode laser, a distributed feedback laser, or a distributed Bragg reflector laser.

The alkali atom may be an atom selected from rubidium, cesium, or sodium.

The atomic spectroscopy method may use an atomic spectroscopy selected from a saturated absorption spectroscopy, a polarization spectroscopy, and a modulation transfer spectroscopy.

The piezo controller may be configured to generate a signal for controlling a movement of the piezo actuator, based on a signal output from the modulator bias controller.

The movement of the piezo actuator may be controlled based on the signal received from the piezo controller to adjust a path of the second beam.

A phase of the sixth beam may be fixed to a predetermined phase in accordance with a path of the second beam being controlled by controlling the movement of the piezo actuator based on the signal controlled by the modulator bias controller.

According to another aspect, there is also provided a phase stabilization method including receiving, from a laser, a beam with a frequency fixed, splitting the received beam into a first beam and a second beam using a first beam splitter, receiving, by a second beam splitter, the first beam reflected at a first mirror and the second beam reflected at a second mirror in which a piezo actuator is attached, and splitting the received first and second beams into a third beam and a fourth beam, receiving, by a third beam splitter, the fourth beam and splitting the received fourth beam into a fifth beam and a sixth beam, receiving, using a modulator bias controller, the fifth beam and controlling a signal, receiving, using a piezo controller, the signal controlled by the modulator bias controller and generating a signal for controlling a movement of the piezo actuator, and adjusting, by the piezo actuator, a path of the second beam in response to the movement being controlled by the generated signal.

According to still another aspect, there is also provided a non-transitory computer-readable storage medium including a medium configured to store computer-readable instructions, wherein when the computer-readable instructions are executed by a processor, the processor is configured to perform a phase stabilization method, the method which includes receiving, from a laser, a beam with a frequency fixed, splitting the received beam into a first beam and a second beam using a first beam splitter, receiving, by a second beam splitter, the first beam reflected at a mirror and the second beam reflected at a piezo actuator and splitting the received first and second beams into a third beam and a fourth beam, receiving, by a third beam splitter, the fourth beam and splitting the received fourth beam into a fifth beam and a sixth beam, receiving, using a modulator bias controller, the fifth beam and controlling a signal, receiving, using a piezo controller, the signal controlled by the modulator bias controller and generating a signal for controlling a movement of the piezo actuator, and adjusting, by the piezo actuator, a path of the second beam in response to the movement being controlled by the generated signal.

Details of example embodiments are included in the detailed description and drawings.

According to example embodiments of the present specification, there are one or more effects as below.

First, it is possible to stabilize a phase of an output signal using a modulator bias controller and a laser that emits a beam with a frequency fixed. The stabilized phase of the output signal may be quickly stabilized even if external shocks are applied.

Second, it is possible to stably maintain a phase of an output signal to be a desired value through a relatively simple configuration using a modulator bias controller and a laser that emits a beam with a frequency fixed. That is, the phase may be stably maintained using the relatively simple configuration without needing to use a complex feedback circuit configuration. Through this, the phase may be stabilized relatively inexpensively using the simple configuration.

Third, an appropriate filter system in a single-photon-level interferometer may be used to differentiate between a single photon and a frequency-fixed beam used for phase stabilization so as to be used stably in experiments that require precise measurements such as quantum optics or quantum metrology.

Effects of the present disclosure are not limited to the above-mentioned effects, and effects other than the above-mentioned effects can be clearly understood by those of ordinary skill in the art from the following descriptions.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 is a flowchart illustrating a phase stabilization method according to an example embodiment.

DETAILED DESCRIPTION

Terms used in embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

Throughout the specification, the expression "at least one of A, B, and C" may include the following meanings: A alone; B alone; C alone; both A and B together; both A and C together; both B and C together; or all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described with reference to the drawings.

Figure 1:
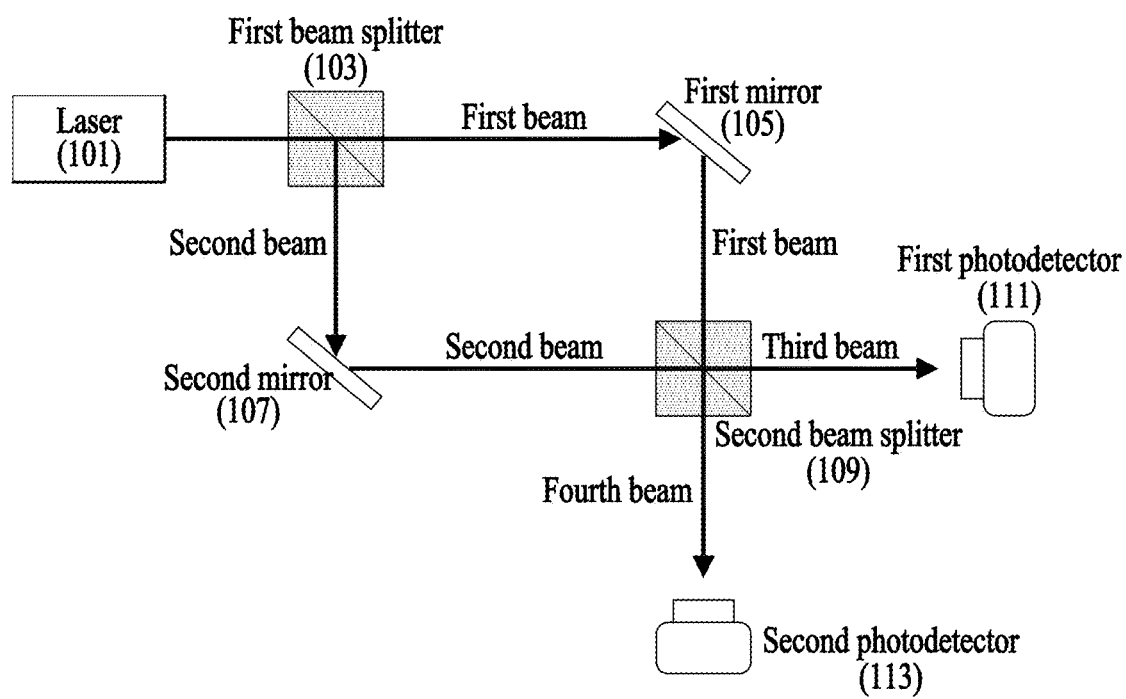
FIG. 1 is a diagram illustrating a phase stabilization system according to an example embodiment.
Figure 2:
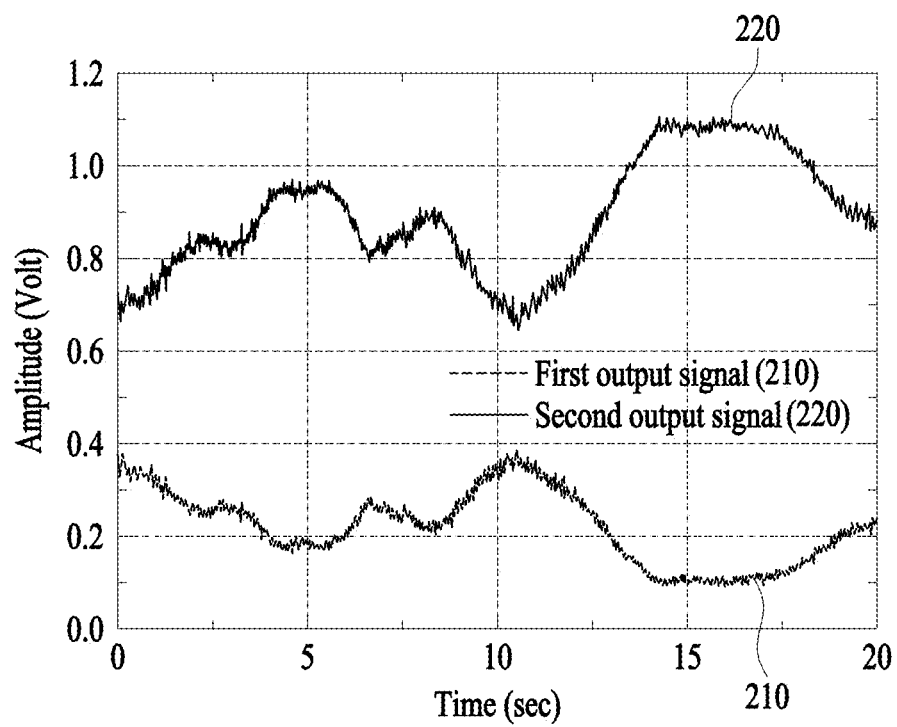
FIG. 2 illustrates an output signal detected from a photodetector when the phase stabilization system of FIG. 1 is used.

FIG. 1 is a diagram illustrating a phase stabilization system according to an example embodiment. FIG. 2 illustrates an output signal detected from a photodetector when the phase stabilization system of FIG. 1 is used.

Referring to FIG. 1, a phase stabilization system may include at least one of a laser 101, a first beam splitter 103, a first mirror 105, a second mirror 107, a second beam splitter 109, a first photodetector 111, and a second photodetector 113.

The first beam splitter 103 may receive a beam from the laser 101. The first beam splitter 103 may split the received beam into a first beam and a second beam. Here, a ratio at which the beam splitter splits the received beam may be set in advance. The beam may be split, for example, at a ratio of 50:50. For example, the first beam splitter 103 may split the received beam at the ratio of 50:50 into the first beam and the second beam.

The second beam splitter 109 may receive the first beam reflected at the first mirror 105. Also, the second beam splitter 109 may receive the second beam reflected at the second mirror 107. The second beam splitter may split the received first and second beams at the ratio of 50:50 into a third beam and a fourth beam.

Here, the third beam output from the second beam splitter 109 may be detected by the first photodetector 111, and the fourth beam output from the second beam splitter 109 may be detected by the second photodetector 113. Here, the photodetector may be a silicon photodetector.

Referring to FIG. 2, a first output signal 210 may correspond to a signal detected by the first photodetector 111, and a second output signal 220 may correspond to a signal detected by the second photodetector 113. That is, the first output signal may correspond to the third beam detected by the first photodetector 111, and the second output signal may correspond to the fourth beam detected by the second photodetector 113.

A graph may be a graph corresponding to the first output signal 210, and a graph may be a graph corresponding to the second output signal 220. In a situation in which external shock is absent, due to a phase change caused by a flow of atmospheric air or by minute vibrations, interference phases of the signals detected by the first photodetector 111 and the second photodetector 113 may fluctuate unstable as shown in FIG. 2. At this time, the phases of the signals detected by the first photodetector 111 and the second photodetector 113 may fluctuate unstable due to repeated constructive interference and destructive interference.

Figure 3:
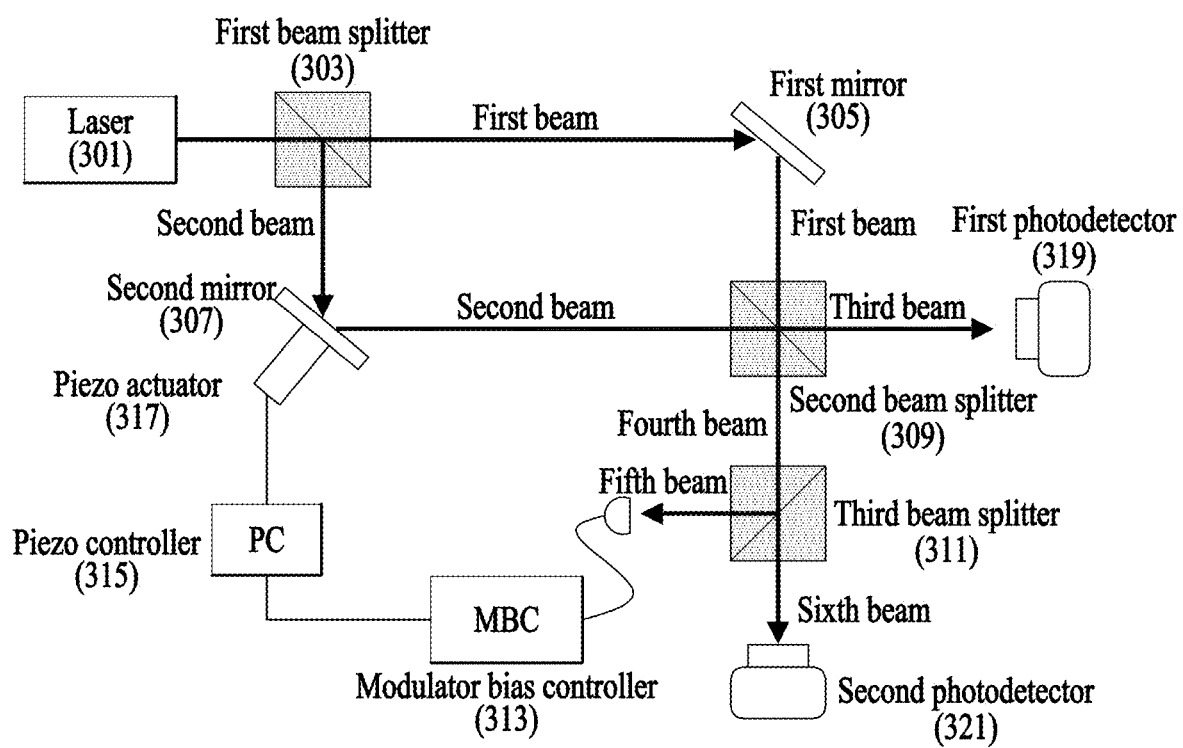
FIG. 3 is a diagram illustrating a phase stabilization system according to another example embodiment.
Figure 4:
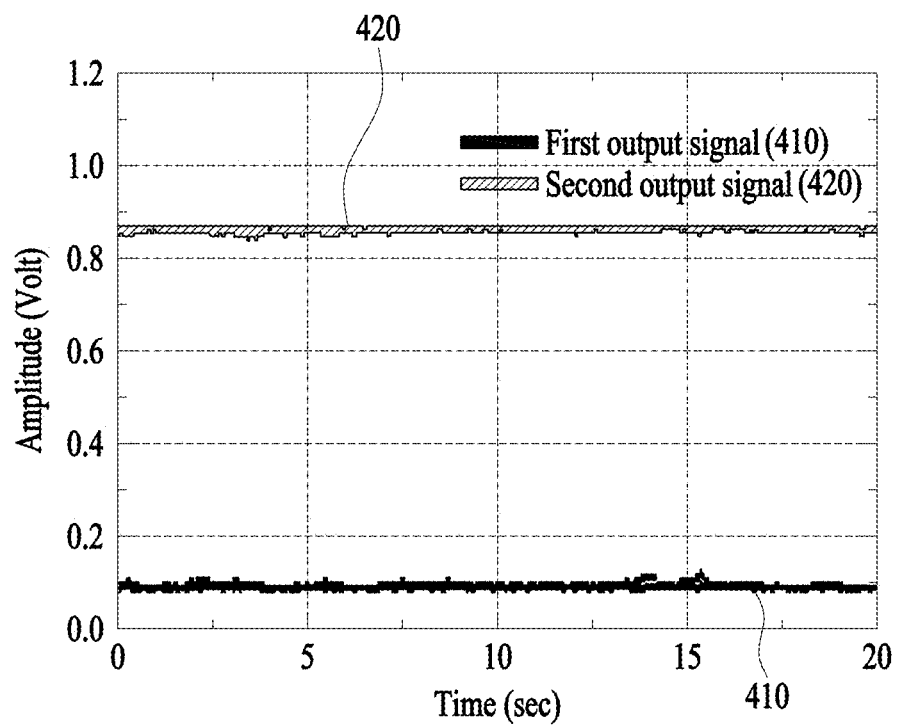
FIG. 4 illustrates an example of an output signal detected from a photodetector when the phase stabilization system of FIG. 3 is used.
Figure 5:
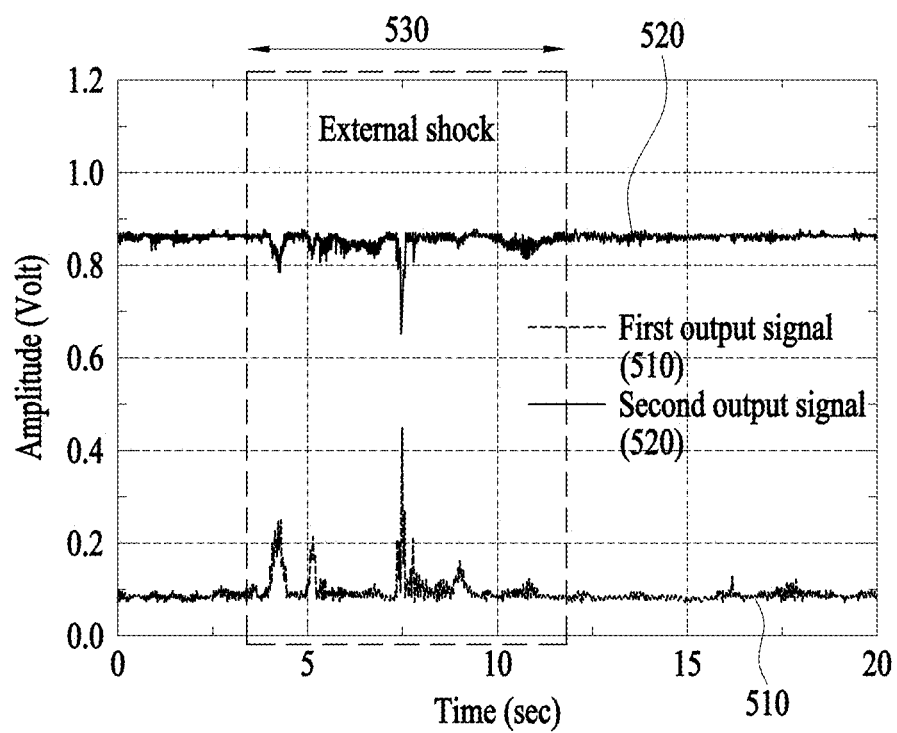
FIG. 5 illustrates an example of an output signal detected from a photodetector when a phase stabilization system is used in case of external shock.

FIG. 3 is a diagram illustrating a phase stabilization system according to another example embodiment. FIG. 4 illustrates an example of an output signal detected from a photodetector when the phase stabilization system of FIG. 3 is used. FIG. 5 illustrates an example of an output signal detected from a photodetector when a phase stabilization system is used in case of external shock.

Referring to FIG. 3, a phase stabilization system may include at least one of a laser 301, a first beam splitter 303, a first mirror 305, the second mirror 307, a second beam splitter 309, a third beam splitter 311, a modulator bias controller 313, a piezo controller 315, a piezo actuator 317, a first photodetector 319, and a second photodetector 321.

Here, the laser 301 may emit a beam with a frequency fixed. The laser 301 may input the frequency-fixed beam in the phase stabilization system along with single photons having different wavelengths used for actual measurement and monitor an intensity of a signal coming out of an output terminal such as a photodetector, so that the phase is stably controlled. In this instance, the frequency of the beam emitted from the laser 301 may be fixed to an atomic transition line obtained from an atomic spectroscopy method using a wavelength tunable laser and an atomic vapor cell including an alkali atom.

At this time, as the wavelength tunable laser, a laser selected from an external cavity diode laser, a distributed feedback laser, or a distributed Bragg reflector laser may be used. Such laser may be a laser having a narrow linewidth of 1 megahertz (MHz) or less.

In addition, the alkali atom may be determined based on an atomic transition line close to a desired wavelength. Specifically, when a measurement experiment is performed using the phase stabilization system, a wavelength may be set differently based on a purpose of the measurement. For example, when a wavelength of 810 nanometers (nm) is required, rubidium having a transition line of 780 nm, which is close to 810 nm, may be used as the alkali atom. Also, when the wavelength of 810 nm is required, cesium having a transition line of 852 nm, which is close to 810 nm, may be used as the alkali atom. In other words, the alkali atom may be an alkali atom selected from rubidium, cesium, or sodium.

Also, as the atomic spectroscopy method for fixing the frequency, an atomic spectroscopy method selected from a saturated absorption spectroscopy, a polarization spectroscopy, and a modulation transfer spectroscopy may be used. Due to this, the beam emitted from the laser 301 may be changed approximately the same as a phase of an actually measured photon in the phase stabilization system.

The first beam splitter 303 may receive a beam from the laser 301. The first beam splitter 303 may split the received beam into a first beam and a second beam. Here, a ratio at which the beam splitter splits the received beam may be set in advance. The beam may be split at, for example, a ratio of 50:50. For example, the first beam splitter 303 may split the received beam at the ratio of 50:50 into the first beam and the second beam.

The second beam splitter 309 may receive the first beam reflected at the first mirror 305. Also, the second beam splitter 309 may receive the second beam reflected at the second mirror 307. The second beam splitter 309 may split the received first and second beams at the ratio of 50:50 into a third beam and a fourth beam. Here, the piezo actuator 317 may be attached to one side of the second mirror 307, and the second beam may be reflected at the other side of the second mirror 307.

The third beam splitter 311 may receive the fourth beam and split the fourth beam at the ratio of 50:50 into a fifth beam and a sixth beam. At this time, the first photodetector 319 may receive the third beam split by the second beam splitter 309, and the second photodetector 321 may receive the sixth beam split by the third beam splitter 311. Here, in the first photodetector 319 and the second photodetector 321, constructive interference and destructive interference may arbitrarily occur due to vibrations of the unstable phase of the detected signal.

Here, a size of the signal detected by the second photodetector 321 may be monitored in real time. That is, a size of the sixth beam detected by the second photodetector 321 may be monitored in real time.

In this instance, through a photodetector in the modulator bias controller 313, the modulator bias controller 313 may receive the fifth beam split by the third beam splitter 311 and control the fifth beam. The modulator bias controller 313 may convert the fifth beam received through the photodetector into an electric signal and output the electric signal. At this time, a piezo element (e.g., piezo controller and piezo actuator) may be controlled by the electric signal, so that phases of the third beam and the sixth beam are stably maintained.

Specifically, the modulator bias controller 313 may output the electric signal by controlling the fifth beam such that the phase of the sixth beam monitored by the second photodetector 321 is maximized or minimized. At this time, the modulator bias controller 313 may output the electric signal by initializing an overall range of the fifth beam such that the phase of the sixth beam is maximized or minimized. A locking point of a signal may be selected to be a maximum, minimum, or intermediate point through manipulation of the modulator bias controller 313.

The modulator bias controller 313 may output the electric signal by controlling the fifth beam which is an optical signal. The piezo controller 315 may receive the electric signal output from the modulator bias controller 313. In this instance, the electric signal output from the modulator bias controller 313 may be a signal in a range from 0 to 5 volts (V).

In response to the electric signal being received, the piezo controller 315 may generate a signal for controlling a movement of the piezo actuator 317 and output the generated signal. The piezo actuator 317 may receive the signal output from the piezo controller 315. In this instance, as the piezo actuator 317, a piezo stack actuator may be used. The piezo actuator 317 may be attached to one side of the second mirror 307 to control a fine movement of the second mirror. That is, a path of the beam emitted from the laser 301 may be split into the first beam and the second beam. A path of the second beam may be finely changed in response to the movement of the second mirror 307 being controlled by the piezo actuator 317. Due to this, the phase of the second beam may be finely changed. As such, through the second beam of which the path is finely controlled, phases of the third beam and the sixth beam may be fixed to a predetermined phase. For example, as illustrated in FIGS. 4 and 5, the phase of the third beam may be fixed to the valley, and the phase of the sixth beam may be fixed to the peak.

Referring to FIG. 4, a first output signal 410 may correspond to a signal detected by the first photodetector 319, and a second output signal 420 may correspond to a signal detected by the second photodetector 321. That is, the first output signal may correspond to the third beam detected by the first photodetector 319, and the second output signal may correspond to the sixth beam detected by the second photodetector 321.

A graph may be a graph corresponding to the first output signal 410, and a graph may be a graph corresponding to the second output signal 420. FIG. 2 illustrates the example in which the phase of the output signal is unstable due to a phase change caused by a flow of atmospheric air or by minute vibrations in the absence of external shock. Unlike the example of FIG. 2, FIG. 4 illustrates an example in which an output signal may have a stable phase. In other words, in the example of FIG. 4 compared to FIG. 2, the first output signal 410 may be stably fixed to a lowest phase, and the second output signal 420 may be stably fixed to a greatest phase.

Likewise, referring to FIG. 5, a first output signal 510 may correspond to a signal detected by the first photodetector 319, and a second output signal 520 may correspond to a signal detected by the second photodetector 321. That is, the first output signal may correspond to the third beam detected by the first photodetector 319, and the second output signal may correspond to the sixth beam detected by the second photodetector 321. A graph may be a graph corresponding to the first output signal 510, and a graph may be a graph corresponding to the second output signal 520.

FIG. 4 illustrates the example in which the phase of the output signal of the phase stabilization system is stably fixed in the absence of external shock. In contrast, FIG. 5 illustrates a change in the phase of the output signal of the phase stabilization system when external shock occurs. Specifically, when the external shock occurs in a time section 530, phases of the first output signal 510 and second output signal 520 may be temporarily changed due to the external shock. After the time section 530, however, it can be seen that the phases are stably fixed again. In this instance, the first output signal 510 and the second output signal 520 may be subjected to constructive interference or destructive interference due to the external shock occurring in the time section 530, so that the phases are changed in different directions.

FIG. 6 is a flowchart illustrating a phase stabilization method according to an example embodiment.

Referring to FIG. 6, in operation S610, a beam with a frequency fixed may be received from a laser. In this instance, the frequency of the beam may be fixed to an atomic transition line obtained from an atomic spectroscopy method using a wavelength tunable laser and an atomic vapor cell including an alkali atom. In this instance, as the wavelength tunable laser, a laser selected from an external cavity diode laser, a distributed feedback laser, or a distributed Bragg reflector laser may be used. In addition, the alkali atom may be determined based on an atomic transition line close to a desired wavelength. Specifically, when a measurement experiment is performed using the phase stabilization system, a wavelength may be set differently based on a purpose of the measurement. For example, when a wavelength of 810 nm is required, rubidium having a transition line of 780 nm, which is close to 810 nm, may be used as the alkali atom. Also, when the wavelength of 810 nm is required, cesium having a transition line of 852 nm, which is close to 810 nm, may be used as the alkali atom. In other words, the alkali atom may be an alkali atom selected from rubidium, cesium, or sodium. Also, as the atomic spectroscopy method for fixing the frequency, an atomic spectroscopy method selected from a saturated absorption spectroscopy, a polarization spectroscopy, and a modulation transfer spectroscopy may be used.

In operation S620, the received beam may be split into a first beam and a second beam using a first beam splitter. That is, the beam received from the laser may be split into two paths, the first beam and the second beam. At this time, the first beam may be reflected at a first mirror, and the second beam may be reflected at a second mirror in which a piezo actuator is attached to one side.

In operation S630, a second beam splitter may receive the first beam reflected at the first mirror and the second beam reflected at the second mirror in which the piezo actuator is attached and split the received first and second beams into a third beam and a fourth beam. In this instance, the third beam may include the first beam and the second beam at a ratio of 50:50, or the fourth beam may include the first beam and the second beam at the ratio of 50:50. The third beam may be detected through a first photodetector.

In operation S640, a third beam splitter may receive the fourth beam and split the fourth beam into a fifth beam and a sixth beam. In this instance, the fifth beam and the sixth beam may correspond to beams into which the fourth beam is split at the ratio of 50:50. Here, the sixth beam may be detected through a second photodetector.

In operation S650, a modulator bias controller may receive the fifth beam and control a signal. Specifically, the modulator bias controller may receive the fifth beam, control the received fifth beam, and then output an electric signal.

In operation S660, a piezo controller may receive a signal output from the modulator bias controller and generate a signal for controlling a movement of a piezo actuator. Also, in operation S670, the movement of the piezo actuator may be controlled by the signal generated by the piezo controller. Through this, a path of the second beam reflected at the second mirror may be adjusted.

According to an example embodiment, when a phase stabilization system is used, by controlling a piezo element (e.g., the piezo controller and the piezo actuator) based on the electric signal output from the modulator bias controller while monitoring an intensity of an output signal detected by the first photodetector or the second photodetector, a phase or phase difference of the output signal may be constantly maintained. Accordingly, when the phase stabilization system is used, a phase change may be relatively stabilized as illustrated in FIGS. 4 and 5 even if an airflow or minute vibration occurs, while if the phase stabilization system is not used, the phase change may be unstable due to the airflow or minute vibration as illustrated in FIG. 2.

The electronic device or terminal described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

The above-described embodiments are merely examples, and other embodiments may be implemented within the scope of the following claims.

What is claimed is:

1. A phase stabilization system comprising:
a laser configured to emit a beam with a frequency fixed;
a first beam splitter configured to split the beam received from the laser into a first beam and a second beam;
a first mirror configured to reflect the first beam;
a second mirror configured to reflect the second beam, wherein a piezo actuator is attached to one side of the second mirror;
a second beam splitter configured to receive the first beam reflected at the first mirror and the second beam reflected at the second mirror and split the received first and second beams into a third beam and a fourth beam;
a first photodetector configured to detect the third beam output from one side of the second beam splitter;
a third beam splitter configured to receive the fourth beam output from the other side of the second beam splitter and split the received fourth beam into a fifth beam and a sixth beam;
a modulator bias controller configured to receive the fifth beam output from one side of the third beam splitter;
a second photodetector configured to detect the sixth beam output from the other side of the third beam splitter; and
a piezo controller configured to receive a signal controlled by the modulator bias controller.

2. The phase stabilization system of claim 1, wherein the beam emitted by the laser has a frequency fixed to an atomic transition line obtained from an atomic spectroscopy method using a wavelength tunable laser and an atomic vapor cell including an alkali atom.

3. The phase stabilization system of claim 2, wherein the wavelength tunable laser uses a laser selected from an external cavity diode laser, a distributed feedback laser, or a distributed Bragg reflector laser.

4. The phase stabilization system of claim 2, wherein the alkali atom is an atom selected from rubidium, cesium, or sodium.

5. The phase stabilization system of claim 2, wherein the atomic spectroscopy method uses an atomic spectroscopy selected from a saturated absorption spectroscopy, a polarization spectroscopy, and a modulation transfer spectroscopy.

6. The phase stabilization system of claim 1, wherein the piezo controller is configured to generate a signal for controlling a movement of the piezo actuator, based on a signal output from the modulator bias controller.

7. The phase stabilization system of claim 6, wherein the movement of the piezo actuator is controlled based on the signal received from the piezo controller to adjust a path of the second beam.

8. The phase stabilization system of claim 6, wherein a phase of the sixth beam is fixed to a predetermined phase in accordance with a path of the second beam being controlled by controlling the movement of the piezo actuator based on the signal controlled by the modulator bias controller.

9. A phase stabilization method comprising:
receiving, from a laser, a beam with a frequency fixed;
splitting the received beam into a first beam and a second beam using a first beam splitter;
receiving, by a second beam splitter, the first beam reflected at a first mirror and the second beam reflected at a second mirror in which a piezo actuator is attached, and splitting the received first and second beams into a third beam and a fourth beam;
receiving, by a third beam splitter, the fourth beam and splitting the received fourth beam into a fifth beam and a sixth beam;
receiving, using a modulator bias controller, the fifth beam and controlling a signal;
receiving, using a piezo controller, the signal controlled by the modulator bias controller and generating a signal for controlling a movement of the piezo actuator; and
adjusting, by the piezo actuator, a path of the second beam in response to the movement being controlled by the generated signal.

10. A non-transitory computer-readable medium having instructions stored thereon that, when executed by a processor, cause the processor to perform phase stabilization operations comprising:
receiving, from a laser, a beam with a frequency fixed;
splitting the received beam into a first beam and a second beam using a first beam splitter;
receiving, by a second beam splitter, the first beam reflected at a mirror and the second beam reflected at a piezo actuator and splitting the received first and second beams into a third beam and a fourth beam;

receiving, by a third beam splitter, the fourth beam and splitting the received fourth beam into a fifth beam and a sixth beam;

receiving, using a modulator bias controller, the fifth beam and controlling a signal;

receiving, using a piezo controller, the signal controlled by the modulator bias controller and generating a signal for controlling a movement of the piezo actuator; and adjusting, by the piezo actuator, a path of the second beam in response to the movement being controlled by the generated signal.

* * * * *